June 13, 1972   R. C. MOTT   3,669,561
HYDRODYNAMIC PUMP
Filed Oct. 9, 1970
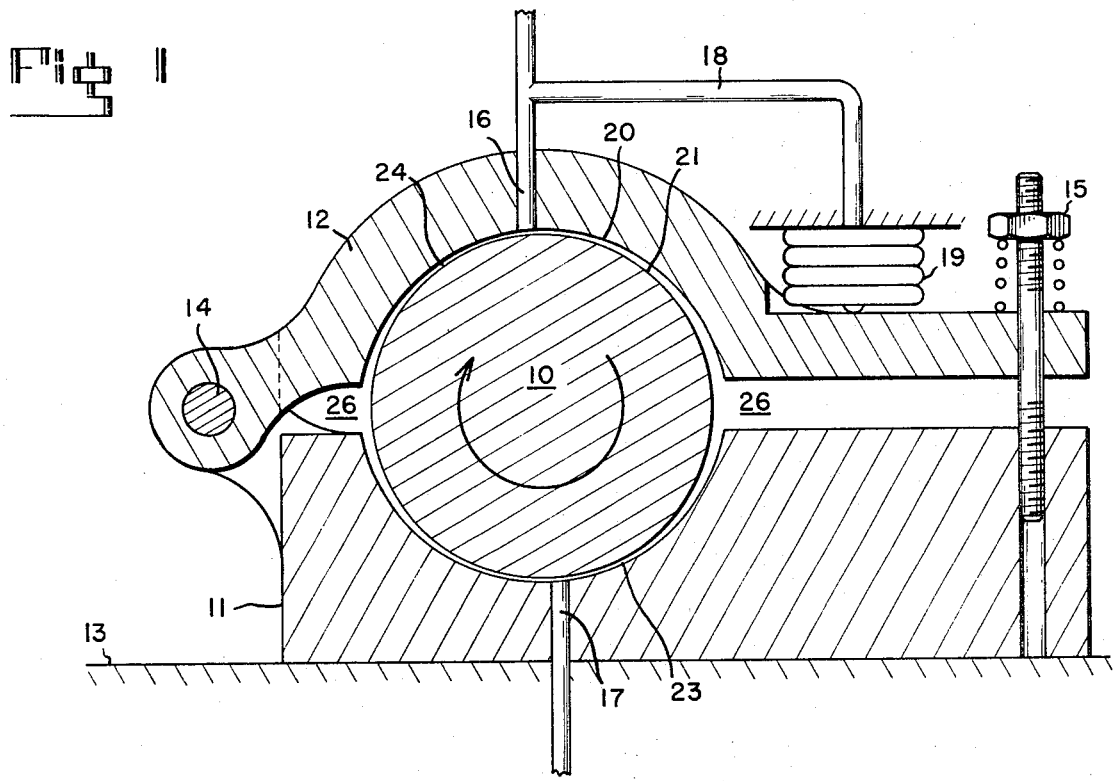
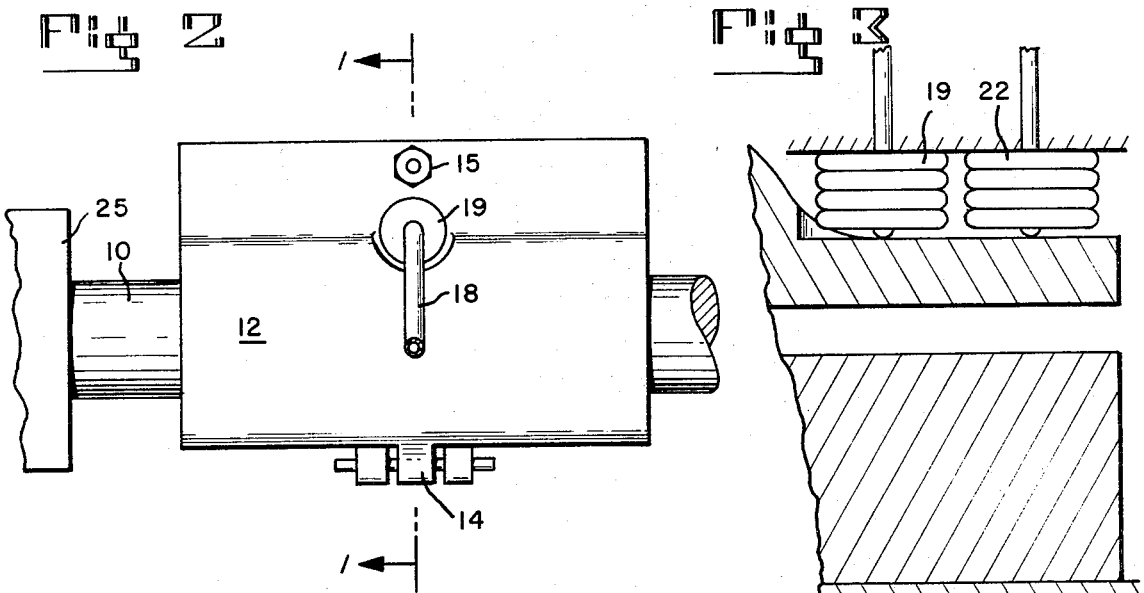
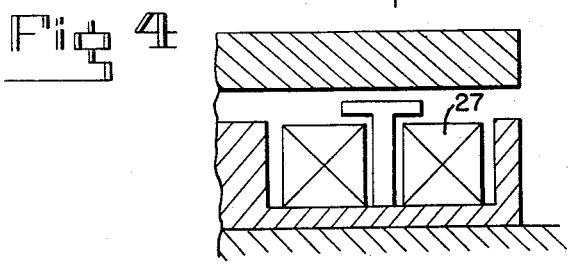
INVENTOR.
RICHARD C. MOTT
BY
ATTORNEY.

United States Patent Office 3,669,561
Patented June 13, 1972

---

3,669,561
HYDRODYNAMIC PUMP
Richard C. Mott, Harwood Heights, Ill., assignor to
Honeywell Inc., Minneapolis, Minn.
Filed Oct. 9, 1970, Ser. No. 79,418
Int. Cl. F01d *1/36;* F03b *5/00*
U.S. Cl. 415—90                                10 Claims

ABSTRACT OF THE DISCLOSURE

A high pressure, low volume, hydrodynamic pump comprising a sleeve, a shaft rotatable within the sleeve, means to vary the gap between the shaft and the sleeve, and an outlet in the sleeve. When submerged in or otherwise provided with a supply of fluid such as oil, relative motion between the sleeve and the shaft results in the establishment of a hydrodynamic pressure between the sleeve and the shaft which pressure can be increased or decreased by decreasing or increasing the gap between the sleeve and the shaft.

BACKGROUND AND SUMMARY OF THE INVENTION

This invention relates to pumps and more particularly to high pressure, low volume pumps such as are suitable for use in hydraulic actuators or the like.

The subject invention utilizes well known principles of lubrication to provide a novel, hydrodynamic pump capable of pumping small volumes of fluid under very high pressure. Ordinarily a fluid under high pressure is desired in a bearing in order that the bearing support a predetermined load. In the subject invention a variable load is applied in order to obtain a desired output pressure. In either case the essential conditions necessary for the generation of a load carrying film by hydrodynamic action between sliding surfaces are, relative motion between the surfaces, and, an oil film converging in the direction of motion.

In the preferred embodiment of the subject invention relative motion between the two bearing surfaces is provided by a shaft or journal rotating within a sleeve. A converging oil film is established by the converging surfaces of the shaft and the interior of the sleeve, the diameter of the shaft being less than the inside diameter of the sleeve. The oil film thus established prevents any contact between the sleeve and the shaft while the latter is rotating. This lack of contact gives rise to the pump having an inherently long life. Outlets are provided in the sleeve and means are provided to vary the load or to vary the gap between the sleeve and the shaft to thereby vary the output pressure.

Because of inherent negative feedback in the pump, the pump is very nearly independent of the fluid viscosity. Hence fluids having a wide range of viscosities are suitable for use in the pump and temperature changes causing changes in the fluid viscosity do not appreciably affect performance.

Because of the high pressures generated by the pump, considerable force may be required to diminish the gap between the sleeve and the shaft. Positive feedback may be incorporated in order to reduce the external force so required.

DESCRIPTION OF THE DRAWING

FIG. 1 is a cross-sectional view of one embodiment of the invention.

FIG. 2 is a plan view of the embodiment illustrated in FIG. 1.

FIG. 3 is an illustration of an alternative means of varying the gap between the shaft and the sleeve.

FIG. 4 is an illustration of a second alternative means of varying the gap between the shaft and the sleeve.

DETAILED DESCRIPTION OF THE INVENTION

In FIG. 1 a circular shaft or journal 10 is rotatable within a sleeve having two halves 11 and 12 which are carried by a base 13. Both the sleeve and shaft should be of a relatively rigid material, although a suitable resin type material such as hard rubber may particularly lend itself for use as the sleeve material. The surface finishes of the shaft and of the interior of the sleeve should be relatively smooth because of the very thin oil films developed therebetween. The two halves are connected by a loosely fitting hinge 14 on one side of the shaft and a manual adjustment means 15 on the other side of the shaft. The loosely fitting hinge allows the sleeve to be substantially self-aligning with respect to the shaft. The spring-loaded adjustment means 15 allows the selective variation of the gap between the shaft 10 and the sleeve. For any given fluid, such as oil or the like, the hydrodynamic pressure developed between the sleeve and shaft depends primarily upon the speed of rotation of the shaft and the load imposed on the bearing. Since the gap between the sleeve and the shaft is a function of the load, adjustment of the gap results in an adjustment of the pressure.

If the entire pump is submerged in or is otherwise supplied with a supply of fluid through inlet means such as regions 26, and if the shaft is rotated within the sleeve by means of a motor or the like 25, an oil film will develop in the regions 23 and 24 because of the convergence of the surfaces 20 and 21 of the interior of the sleeve and of the shaft respectively. These surfaces continue to converge up to points directly at the top and the bottom of the shaft 10, assuming the shaft is rotating clockwise, beyond which points the surfaces diverge. The areas where the maximum hydrodynamic pressures are developed are slightly up stream of these points of closest convergence. The two outlets 16 and 17 are accordingly located slightly off center of the shaft in order that they coincide with these two points of maximum hydrodynamic pressure.

Connected to the outlet 16 is a conduit 18 which in turn is connected to a bellows 19. This bellows provides positive feedback. As hydrodynamic pressure develops between the sleeve and the shaft, the sleeve and shaft are forced apart by means of this pressure. Hence there is inherent negative feedback in the pump. In order to further increase the pressure by means of increasing the load or, equivalently, decreasing the gap, this inherent negative feedback force must be overcome. The provision of positive feedback in part negates this negative feedback force so that the additional external force required to overcome the negative feedback force is diminished. Of course, the positive feedback force provided by the bellows 19 must be somewhat less than the inherent negative feedback force in order that a run-away condition does not develop.

An alternative to the manual adjustment means 15 is illustrated in FIG. 3. Here a bellows 22 provides the additional external force required to increase the pressure output. The bellows 22 may be a condition responsive element such as a temperature responsive, vapor-filled element. The pressure output of the pump now increases or decreases according to an increase or a decrease in a sensed temperature making the pump suitable as, for example, a damper actuator in a unit ventilator. Obviously other means of varying the gap other than a condition responsive element may be used, such as an electromagnet 27 as shown in FIG. 4 which decreases the gap in response to an increase in current input.

Obviously there are many uses to which the subject invention may be put other than those disclosed herein, and many embodiments of the invention possible other than those disclosed. For example, a thrust bearing may be used instead of a journal bearing. Accordingly it is intended that the scope of the subject invention be limited only by the scope of the appended claims.

The embodiments of the invention in which an exclusive property or right is claimed are defined as follows:

1. A hydrodynamic pump comprising:
    fluid inlet means;
    first and second surfaces separated by a variable gap, the surfaces being substantially smooth and slightly converging, one towards the other, and the fluid inlet means providing a supply of fluid between the surfaces;
    means to cause relative motion between the surfaces whereby a fluid film and a hydrodynamic pressure are caused to develop therebetween, the hydrodynamic pressure generally increasing upon the convergence of the surfaces;
    fluid outlet means in one of the surfaces, the fluid outlet means located and arranged at or near the point of the closest convergence of the first and second surfaces so as to be near or at the point where the highest hydrodynamic pressure is developed between the surfaces; and,
    means to selectively vary the gap between the surfaces whereby the fluid outlet pressure is correspondingly varied.

2. The hydrodynamic pump according to claim 1 wherein the first surface comprises the surface of a cylindrical shaft and the second surface comprises the interior surface of a sleeve adapted to fit around the shaft.

3. The hydrodynamic pump according to claim 2 wherein the means to cause relative motion between the surfaces includes means to rotate the shaft, and the outlet means is located in the sleeve.

4. The hydrodynamic pump according to claim 2 wherein the sleeve is self-aligning with respect to the shaft.

5. The hydrodynamic pump according to claim 1 wherein the means to selectively vary the gap between the surfaces includes positive feedback means connected to the outlet means.

6. The hydrodynamic pump according to claim 2 wherein the outlet means includes first and second outlets in the sleeve.

7. The hydrodynamic pump according to claim 2 wherein the means to selectively vary the gap between the sleeve and the shaft includes manual adjustment means.

8. The hydrodynamic pump according to claim 2 wherein the means to selectively vary the gap between the sleeve and the shaft includes condition responsive means.

9. The hydrodynamic pump according to claim 2 wherein the means to selectively vary the gap between the sleeve and the shaft includes electro-magnet means.

10. The hydrodynamic pump according to claim 2 wherein;
    the means to cause relative motion between the surfaces includes means to rotate the shaft;
    the outlet means includes oppositely disposed first and second outlet means in the sleeve;
    the sleeve is self-aligning with respect to the shaft; and
    the means to selectively vary the gap between the surfaces includes positive feedback means connected to the outlet means.

References Cited

UNITED STATES PATENTS

| | | | |
|---|---|---|---|
| 2,969,020 | 1/1961 | Fazekas | 415—90 |
| 2,992,615 | 7/1961 | Fazekas et al. | 415—90 |
| 2,873,683 | 2/1959 | Sherwood | 415—90 |
| 3,037,457 | 6/1962 | Sternlicht | 415—90 |
| 2,777,394 | 1/1957 | Modrovsky et al. | 415—90 |

CARLTON R. CROYLE, Primary Examiner

R. J. SHER, Assistant Examiner

U.S. Cl. X.R.

416—4; 417—300